Patented Apr. 7, 1942

2,279,198

UNITED STATES PATENT OFFICE 2,279,198

CATALYTIC CONVERSION OF HYDROCARBONS

Walter F. Huppke, Lomita, Calif., assignor to Union Oil Company of California, Los Angeles, Calif., a corporation of California No Drawing. Application January 18, 1938, Serial No. 185,546

20 Claims. (Cl. 196—50)

This invention relates to catalysts and the process of making the same and has particular application to the manufacture of catalysts containing zinc oxide useful in effecting conversion of hydrocarbons. It further relates to processes for the catalytic conversion of hydrocarbons in which said catalysts containing zinc oxide are used.

Hydrocarbon conversion is effected by numerous reactions such as dehydrogenation, hydrogenation, molecular rearrangement, alkylation, polymerization, and the like. Such conversions as are effected by heat alone are widely used in the petroleum industry in such forms as cracking of heavy oils, reforming of gasolines, and dehydrogenation of normally gaseous hydrocarbons. Straight pyrolysis, however, suffers the defect that the reactions are not controlled and the yields of the desired product are often very low. Proper catalysis makes possible efficient promotion and guidance of such reactions, but even when an effective catalyst is found its use will not be efficient unless it displays the normally rare quality of combining high activity, long life, immunity to poisoning, ease of regeneration, and moderate cost.

Catalysts consisting of zinc oxide or comprising zinc oxide as the active agent have been used for the dehydrogenation of alcohols, but so far as the applicant has been able to discover no such preparation has been sufficiently active to assist in such hydrocarbon conversions as the hydrogenation of ethylene, the dehydrogenation of the butanes and the like.

It is an object of the present invention to provide a highly active catalyst containing zinc oxide. It is a further object to provide such a catalyst which is highly active, has a long life, is not easily poisoned, and is easily regenerated. It is a still further object of the invention to provide such a catalyst which is useful in hydrocarbon conversions, such as dehydrogenation, hydrogenation, rearrangement, and reforming. It is a still further object of the invention to provide such catalysts as the foregoing in which zinc oxide is associated with substantial amounts of a difficultly reducible hydrous oxide, such as hydrous zirconium, titanium, aluminum, or thorium oxides or mixtures thereof, with or without small amounts of other appropriate oxides as promoting agents. It is a further object of the invention to provide suitable promoting agents for such catalysts to aid them and to improve the catalytic effects. Still further objects are to provide suitable methods of preparation for such catalysts and to provide suitable processes for the employment of such catalysts in the conversion of hydrocarbons.

Further objects of the invention are to provide processes for the dehydrogenation of non-benzenoid hydrocarbons heavier than methane, especially normally gaseous paraffinic hydrocarbons, in which processes the dehydrogenation is catalyzed by said highly active catalysts containing zinc oxide, and also to provide processes for the reforming of gasoline fractions in which the gasoline hydrocarbons are converted into hydrocarbons of relatively higher knock rating by the catalytic action of said catalysts containing zinc oxide.

Broadly stated, the invention resides in the manufacture, composition, and use of such highly active catalysts containing zinc oxide. The invention further resides in the manufacture, composition and use of catalysts comprising substantial amounts of zinc oxide and difficulty reducible metallic hydrous oxides, especially where such difficultly reducible hydrous oxides are those of zirconium, titanium, aluminum or thorium or mixtures thereof. It further resides in the use of such catalysts for the catalytic conversion of hydrocarbons in a process which comprises contacting the hydrocarbons with the catalyst at elevated temperatures.

The invention further resides in the manufacture, composition and use of such catalysts comprising zinc oxide and hydrous oxides of metals forming difficulty reducible oxides which are capable of being prepared as gels, such as zirconium, aluminum, thorium, titanium, hanium, tantalum and columbium or mixtures of such hydrous oxides.

The invention also resides in the preparation of such catalysts by dehydration of hydroxide precipitates comprising zinc hydroxide and hydroxides of such metals forming difficultly reducible oxides, which mixed precipitates may be formed by co-precipitation from a common solution, or by successive precipitation in different solutions in which one component is separately precipitated and then dispersed in a solution of another component prior to the precipitation of the latter, or by mechanical admixture of separately precipitated hydroxides, or by combinations of these methods, or by other suitable methods. The invention further resides in the preparation of such catalysts by dehydration of hydroxide precipitates in which certain components have been incorporated by adsorption on the precipitated hydroxides. It further resides in the preparation of such catalysts by briquetting or pressing the oxide or hydrous oxide components into a compacted form, for which purpose the components are preferably prepared in a finely comminuted form, as by grinding the oxides or hydrous oxide gels, or by other suitable methods. The invention further resides in the inclusion in the catalyst of small amounts of compounds which act as promoters such as oxides of the basic elements of Groups I and II of the periodic system. The invention further resides in the hydrogenation, dehydrogenation, reforming and kindred conversions of hydrocarbons with catalysts comprising substantial amounts of zinc oxide and of hydrous oxides of the class consisting of zirconium, thorium, titanium and aluminum, with or without the indicated promoting agents. The invention further resides in such processes and catalysts where the catalysts comprise zinc oxide and oxides or hydrous oxides of the class consisting not only of the mentioned group containing zirconium, aluminum, thorium and titanium, but also of the further group containing tantalum, hafnium and columbium.

The invention further resides in the use of such catalysts in a process for dehydrogenating non-benzenoid hydrocarbons such as normally gaseous hydrocarbons heavier than methane, and also in a process for reforming gasoline hydrocarbons.

I use in this specification and the appended claims the term "hydroxide" to designate that type of compound obtained by precipitation with an alkaline precipitant, without regard to whether the precipitated compound is a full hydroxy compound or a hydroxy-oxy compound. I use the term "hydrous oxide" widely to embrace the dehydration product of the hydroxide as obtained by my herein described processes of manufacture and use, without regard to the exact degree of dehydration provided it is less than that obtained by ignition at white heat. The term hydrous oxide thus embraces materials only slightly hydrous, depending on the ease with which the particular compound loses water. Very slightly hydrous materials may be used so long as they maintain their gel structure. I use the term "oxide" as likewise capable of embracing either a hydrated or anhydrous oxide, but without regard to its history of preparation or dehydration. Furthermore in designating a mixed catalyst by reference to its constituent metallic oxides I do not intend to imply that these molecular species are necessarily present as such in the catalyst as finally prepared or as modified by use, since among other things, various possibilities of interreaction may be afforded by the amphoteric character of some of the constituents. Thus, for example, in referring to a hydrous zirconium oxide-zinc oxide catalyst I refer to a catalyst in which the zirconium component has been prepared by certain conditions of dehydration from precipitated zirconium hydroxide, and in which either anhydrous zinc oxide or hydrous zinc oxide has been introduced by any suitable means, but I have no theory or explanation as to the active molecular species or complexes that may be formed from these constituents during the preparation or use of the catalyst. It is quite possible, however, that in such a catalyst as zinc oxide-hydrous zirconium oxide the activity may be related to the formation of hydrous zirconyl zincate or zinc zirconate, or to the formation of ionic lattices or gels in which O= and OH— anions are shared between zinc and zirconium cations.

For purposes of illustration, the preparation of the catalysts will be described in greater detail in connection with the preparation of catalysts containing zinc oxide and hydrous zirconium oxide.

The zirconium component is preferably prepared as a gel, whereby it imparts advantageous physical properties to the structure of the catalysts, such as porosity, large surface area, strength and high adsorptivity. This is readily accomplished by precipitating zirconium hydroxide in an amorphous or gelatinous form which may be dried and/or dehydrated to give the desired product. Such precipitation takes place on treating a dilute solution of a water-soluble zirconium compound such as zirconium nitrate or zirconyl chloride with an alkali, suitably with dilute aqueous ammonia. Other alkalies may be used, particularly when the presence of small quantities of the corresponding alkali oxides are not objectionable or are desired as promoters. When an electrolyte-free gel is desired, the use of ammonia is advantageous, since the precipitate formed therewith is readily washed free of electrolytes and since furthermore any residual ammonium compounds can be removed by volatilization at moderate temperatures. The precipitation of zirconium hydroxide can be conducted cold or hot, but preferably cold since I find that hot precipitation leads to physically weaker gel structures.

In many instances the gelatinous hydroxide precipitate can be obtained by neutralization of an alkaline metallate with an acid, and I find that such an hydroxide precipitate in these instances is equivalent to the hydroxide precipitate obtained by treating a neutral or acid solution of the metal salt with an alkaline precipitant.

The zinc component may be introduced into the catalyst by co-precipitation of the zinc and zirconium hydroxides, or by admixing separately precipitated zinc and zirconium hydroxides, or by successive precipitation, i. e., precipitation of zinc hydroxide on preformed zirconium hydroxide, or by other suitable means. In practice, I find that successive precipitation is advantageous in that it leads to particularly long lived and active catalysts. Although I do not wish to be bound by any theory, I may point out that factors which may be involved to the benefit of this process are: preforming of the zirconium hydroxide gel in the absence of less gelatinous substances such as zinc hydroxide, partial or complete adsorption of the zinc salts on the zirconium gel prior to the conversion of the zinc to the hydroxide, and the insured deposition of the zinc hydroxide as to the external or surface phase. Admixture of separately precipitated hydroxides leads to good catalysts of slightly less efficiency. If prepared with care, catalysts obtained by co-precipitation may approach the serially precipitate catalyst in quality, but the co-precipitation in some instances tends to form catalysts with impaired activity at lower temperatures, perhaps due to ineffective precipitation of zinc in the presence of relatively high concentrations of ammonium salts, or to the difficulty of obtaining pH values which are at once optimum for both the zirconium and zinc precipitation.

Following any of the above hydroxide precipitations, the precipitate is normally washed substantially free of electrolytes, e. g., by filtering and washing the precipitate with hot distilled water until freedom from electrolytes is indicated by the tendency of the precipitate to peptize or disperse in water. Promoting agents are readily introduced by adsorption on the surface of the hydroxide precipitate, as for example by dispersing a washed hydroxide precipitate in a dilute solution of lithium nitrate in the cold, whereby adsorption of the lithium nitrate is effected. Following such adsorption, the precipitate is not washed, or at least not washed to the extent that the promoter is removed.

When the steps dealing with aqueous solutions such as the above have been completed, the moist precipitate is dried under conditions leading to a strong compacted gel. I have found it advantageous to form the precipitate into a cake on a suction filter, and then to dry this cake in an oven for five to seven days at a temperature of 100° F. to 150° F. During this drying, the gel shrinks to 5% or 10% of its original volume and increases greatly in physical strength.

The catalyst may be directly used at this point by breaking it into suitably sized fragments. I prefer to take such fragments, however and subject them to further dehydration, as by gradual heating up to 600° F. to 700° F. in a current of dry air and then maintaining these conditions for two or three hours. By this dehydration treatment the catalyst undergoes still further shrinkage by about one-third the volume of the oven dried gel, and forms a vitreous gel of excellent physical properties. In referring to this step as accomplishing dehydration I do not intend to imply that complete dehydration is necessarily obtained. Catalysts obtained by the practice of this dehydration step offer the advantage that there is no further shrinkage during the use of the catalyst, so that the catalyst bed remains unchanged in volume and form during use. Another advantage of treating the catalyst at 600° F. to 700° F. arises when promoters such as metallic nitrates have been adsorbed on the catalyst, in that their decomposition into oxides and the like is effected by this heat treatment, whereby subsequent decomposition in the catalyst bed, which may in some instances lead to undesirable contamination with various decomposition and reaction products, is avoided. The dehydration step also serves to remove all volatile salts.

In those instances where the oven dried catalyst is used directly, the step of dehydration is actually combined with the initial stage of the catalytic process, either at the temperature of the process, e. g. 850° F. to 1000° F., or at a lower initial temperature. Again the temperature and duration of the dehydration process may be varied over wide limits, and any deficiencies in dehydration thereby suffered can be remedied in the initial stages of the catalytic process.

Although there is but little further shrinkage of a catalyst dehydrated at 600° F. to 700° F. when used at higher temperatures, I believe that further dehydration occurs during the initial stages of such use. Thus when a hydrous zirconium-oxide-zinc oxide catalyst dehydrated at 650° F. was contacted with a dry stream of nitrogen at 850° F., it lost 5% of water in four hours. The catalyst thus dried was then used twenty hours to dehydrogenate iso-butane at 850° F. during which time it gained about 2% in weight due to adsorbed hydrocarbons and tars, and was thereafter regenerated with air at 850° F., during which regeneration it lost only the 2% in weight attributable to removal of hydrocarbon material. Thus the four hour drying period at 850° F. had brought the catalyst to a constant water content for that temperature. Upon ignition of the regenerated catalyst at white heat, however, it lost one percent in weight, presumably due to loss in water, shrank about 35% in volume, and lost all but a small fraction of its catalytic activity. A hydrous aluminum oxide-zinc oxide catalyst behaved similarly, except that the shrinkage and impairment of catalytic activity upon ignition were not quite so great. In general, excessively high temperatures of dehydration, e. g., above red heat, are to be avoided since they impair or destroy the activity of the catalyst. I believe that such impairment arises from the destruction or constriction of the highly distended porous gel structure and/or removal of the last traces of water, although I do not wish to be bound by any theory in this connection.

Instead of preparing the catalyst from a mixture of hydroxides, the components may be separately prepared, preferably as fine powders, and then combined by physical pressure, if desired with a small amount of a moulding lubricant such as graphite, to form a compact coherent mass. The powdered components may be obtained by grinding the hydrous oxides obtained by precipitation and dehydration of the hydroxides, or, in the case of the zinc component, an anhydrous oxide from any suitable source may be used.

In some instances, I find it advantageous to briquette the catalyst as prepared from the mixed hydroxides, particularly when a chalky rather than a vitreous gel has been obtained.

In initiating a catalytic process with a new catalyst, I frequently find it advantageous to bring the catalyst gradually up to reaction temperature in an inert or reducing atmosphere. Hydrogen is well suited for this purpose, particularly when reducible oxides are present in the catalyst. This step is conveniently carried out by passing hydrogen through the catalyst bed while the temperature is being slowly raised to the desired value, the hydrogen being replaced by the reactant gases after the desired temperature has been reached.

Within a few minutes to several hours after contacting the reactant gases, the catalyst displays its maximum activity, as measured for example by the yield of a given product in a continuous flow process. The time required to rise to the maximum activity, I refer to as the induction period, and the time required for the catalyst to drop from maximum activity to half its maximum activity I refer to as the half life. This does not imply, however, that in a succeeding half life period there is again to be found a 50% decrease in activity, for in general I find that the catalyst activity tends to remain more constant at the lower levels of activity.

With any of the above hydrous oxide-zinc oxide catalysts, I find that the gradual decrease in activity with use is largely, if not solely due to the formation of carbonaceous or polymerized bodies on the surface of the catalyst, and that by removal of these surface deposits, I can restore the catalyst to its original activity. I further find that these carbonaceous materials can be removed by combustion or reaction with oxygen containing gases such as air. In practice, I find it convenient to use a catalyst until its activity has decreased to 50% or to any other value at which it becomes economically desirable to regenerate, and then at that point to change the flow from reactant gases to an inert gas, such as nitrogen, without changing the temperature. Gradually increasing proportions of oxygen or air are then introduced into the nitrogen stream, whereby oxidation and regeneration of the catalyst is effected under moderated and controlled conditions. Sudden access of air to the hot spent catalyst is normally to be avoided, owing to the danger of building up harmfully high temperatures by rapid combustion. Other alternatives are of course practicable, such as reducing the temperature of the spent catalyst and then treating it with air directly. Normally regeneration is regarded as complete when the exit gases become substantially free from carbon dioxide. Following regeneration it is in many instances advisable to treat with hydrogen as in the case of new catalysts. This step of reduction is particularly advisable when the catalyst comprises multivalent compounds which are oxidizable under the conditions of regeneration.

These catalyst may be thus regenerated repeatedly to their original maximum activity without change in the character of the catalyst. Furthermore, these catalysts are apparently immune to poisoning other than that due to the accumulation of carbonaceous materials on the surface of the catalyst; for example, small proportions of such notorious poisons for metallic catalysts as arsenic oxide and the like may be actually incorporated in these oxide catalysts without detriment to their quality.

The proportion of the catalyst components in most instances may be varied over wide limits. Active catalysts have been prepared containing as little as 5 mol percent of zinc oxide and as high as 90 mol percent. The higher concentrations of zinc oxide, however, tend to impair the physical strength of the catalyst. Usually the maximum activity is displayed by catalysts containing from 25 to 50 mol percent zinc oxide. Promoters such as alkali oxides may be introduced in small amounts, i. e., from a fraction of a percent to 5%. Further details will be apparent front the following examples.

CATALYST 1.—*Co-precipitated hydrous zirconium oxide-zinc oxide.*—A dilute solution of equimolal quantities of zinc and zirconium nitrate is treated with aqueous ammonia to effect precipitation of the hydroxides. The precipitate is caught on a filter and washed with hot distilled water until substantially free of electrolytes, which point is indicated by the tendency of the precipitate to peptize. The filter cake is then dried at moderate temperatures and then dehydrated in a current of air at 650° F. The vitreous gel thus obtained is broken up and screened to 10 to 20 mesh particles.

CATALYST 2.—*Successively precipitated hydrous zirconium oxide-zinc oxide.*—A 2% solution of zirconium nitrate is treated with sufficient ammonia to precipitate the zirconium as hydroxide. The precipitate is washed substantially free of electrolytes on a filter. The washed precipitate is then stirred into an aqueous 2% solution of zinc nitrate, one mol of zinc nitrate being taken for each mol of zirconium hydroxide. To this mixture ammonia is added to precipitate the zinc hydroxide. The resulting precipitate is again washed free of electrolytes. The washed mass is dried first in an oven at moderate temperatures and then in a current of air at 650° F. The vitreous gel thus obtained is broken and screened to 10 to 20 mesh.

CATALYST 3.—*Successively precipitated hydrous zirconium oxide-zinc oxide-$Li_2O$.*—Washed zirconium-zinc hydroxide precipitate prepared as in Catalyst 2, without drying, is stirred into a dilute lithium nitrate solution containing about 2 mol percent $Li_2O$ based on the finished catalyst. At room temperatures the lithium is substantially completely adsorbed by the hydroxide precipitate. The mixture is filtered to regain the precipitate, which, without washing, is subjected to the further steps of drying, dehydration, etc., as in Catalyst 2.

CATALYST 4.—*Successively precipitated hydrous zirconium oxide-zinc oxide-CaO.*—Following the procedure of Catalyst 3, calcium nitrate is substituted for lithium nitrate.

CATALYST 5.—*Successively precipitated hydrous zirconia-alumina-zinc oxide.*—A mixture of one mol of zirconium hydroxide and one mol of aluminum hydroxide is obtained by co-precipitation of the hydroxides. One mol of zinc hydroxide is then precipitated on this mixed hydroxide base, and further treatment is exactly as in Catalyst 2.

CATALYST 6.—*Separately precipitated hydrous zirconium oxide-zinc oxide.*—Zirconium hydroxide is obtained by treating a dilute solution of zirconium nitrate with dilute ammonium hydroxide and washing the precipitate free of electrolytes. An equivalent of quantity of zinc hydroxide is separately prepared in a similar manner. The two hydroxide precipitates are then well mixed and the mixture is subjected to the further steps of drying, dehydration, etc., as in Catalyst 2.

CATALYST 7.—*Briquetted hydrous zirconium oxide-zinc oxide.*—A gel type catalyst prepared as in the case of Catalyst 2 is ground and the powder briquetted into small pellets after mixing with about 1% of graphite, using a pressure of 50,000 pounds per square inch.

CATALYST 8.—*Successively precipitated hydrous titanium oxide-zinc oxide.*—This catalyst is prepared in the same manner as Catalyst 3, using titanium chloride in the place of zirconium nitrate.

CATALYST 9.—*Co-precipitated hydrous aluminum oxide-zinc oxide.*—This catalyst is prepared in the same manner as Catalyst 1 using aluminum nitrate in the place of zirconium nitrate.

CATALYST 10.—*Successively precipitated hydrous thorium oxide-zinc oxide-CuO.*—This catalyst is prepared in the same manner as Catalyst 3, using thorium in the place of zirconium and a small amount of copper, sufficient to give a slight color to the precipitate, in the place of the lithium.

The drying of these various catalysts may be effected for example in an oven at 100° F. to 150° F. for three or four days.

The effect of each of the above products when used as a catalyst for the dehydrogenation of iso-butane is shown in Table I. This table shows the percentage conversion into iso-butylene obtained at the stated temperature when 10 liters of isobutane gas were passed per hour through 5 ml. of catalyst, corresponding to a contact time of about one second.

TABLE I

*Dehydrogenation of iso-butane*

| Catalyst number | Maximum conversion, percent | | Half life in hours | |
|---|---|---|---|---|
| | 850° F. | 950° F. | 850° F. | 950° F. |
| 1 | 10.1 | 22.9 | 10.0 | 3.0 |
| 2 | 12.2 | 26.4 | 30.0 | 3.0 |
| 3 | 15.5 | 24.5 | Over 30 | 6.0 |
| 4 | 12.2 | 26.4 | Over 30 | 4.0 |
| 5 | 4.5 | 24.5 | Over 30 | 6.0 |
| 6 | 7.5 | 19.5 | 10.0 | 3.0 |
| 7 | 13.3 | | Over 30 | |
| 8 | 14.3 | 19.1 | 8.0 | 2.0 |
| 9 | 9.0 | 22.9 | 20.0 | 10.0 |
| 10 | 9.0 | 17.7 | 24.0 | 6.0 |

Serial precipitation of zinc hydroxide on zirconium hydroxide, usually results in a more active and longer lived catalyst than is obtained by co-precipitation. The effect of increased life is particularly pronounced at lower temperature.

Promotion with small amounts of an alkali metal oxide, exemplified by $Li_2O$, tends to increase the life of the catalyst at all temperatures and also to increase the activity at lower temperatures.

Promotion with small amounts of an alkali earth oxide, exemplified by CaO, tends to increase the life of the catalyst at all temperatures.

Dilution of the zirconia with alumina tends to give a long-lived catalyst which is quite active at higher temperatures.

Further relationships as to the activity and life of other catalysts are demonstrated by the data given in the table.

These hydrous oxide-zinc oxide catalysts can be used to excellent advantage in the catalytic reforming of gasoline. An Edeleanu treated gasoline raffinate consisting of approximately equal proportions of naphthenes and paraffines was passed at a liquid rate of ten milliliters per hour through fifteen milliliters of each of the above catalysts maintained at a temperature of 900° F. to 1000° F. The raffinate was vaporized prior to contacting the catalyst mass, and the operations were conducted at substantially atmospheric pressure. The condensate, which still boiled in the gasoline range, was found to contain from 20% to 50% aromatics and corresponding amounts of unsaturates. The formation of fixed gases was negligible.

The catalytic reforming in many instances may be facilitated by mixing the gasoline vapors with a carrier gas such as hydrogen or nitrogen prior to contacting the catalyst. Amounts of carrier gas may be used which vary in volume from a fraction to several fold the volume of the gasoline vapors.

When gasoline is catalytically reformed in the presence of the hydrous oxide-zinc oxide catalysts various reactions occur. These reactions comprise dehydrogenation of paraffines to unsaturates, dehydrogenation of cyclohexanes to aromatics, dehydrogenation and rearrangement of substituted cyclopentanes to aromatics, and various types of alkylation, cyclization and polymerization. By this process gasolines consisting largely of aliphatics and cyclopentanes have given large yields of aromatics. In general all of these reactions yield hydrocarbons of higher knock-rating than the parent stock.

The high knock-rating reformed gasolines obtained according to my process contain but little unstable gum forming material in spite of their unsaturate content, and they may be refined with only a nominal treatment.

All of the stated catalysts, when used for the conversion of hydrocarbons, such as the dehydrogenation of normally gaseous or heavier hydrocarbons, or for the reforming of gasoline can be readily regenerated after their activity has decreased with use, by contacting with air or other oxygen containing gas at an elevated temperature following the procedure described above.

The catalytic conversion of the hydrocarbons may be conducted at any pressure and temperature thermodynamically favorable to the reaction desired. The process of conversion may in some instances be operated to take place either with the vapor or liquid phase in contact with the catalyst. By suitable choice of thermodynamic conditions, the reverse reactions of those described above can be made to take place, and these catalysts are correspondingly effective in the hydrogenation of unsaturated hydrocarbons or aromatics.

The catalyst may be physically prepared in any suitable manner, either as granules or briquetted pellets, as above described, or as a dust, which is suitable in case the catalyst is vapor-borne, or in physical admixture with various types of supporting agents.

For conversion in general of hydrocarbons I prefer to use with the zinc oxide such hydrous oxides as give strong porous gels. These preferred hydrous oxides constitute a class which may be divided into two groups. The group which I have found to have particular value for the dehydrogenation of low boiling paraffinic hydrocarbons such as the normally gaseous paraffinic hydrocarbons heavier than methane consists of the hydrous oxides of zirconium, thorium, aluminum and titanium. This constitutes also a preferred group both for treating vaporized heavier hydrocarbons. A secondary group consists of the oxides or hydrous oxides of hafnium, tantalum and columbium, which however may be at present objectionable from the cost standpoint. In addition to using these catalysts for dehydrogenation specifically, they may also be used for reforming as more fully hereinafter discussed, and they may also be employed in the reverse reactions of hydrogenation by suitable choice of thermo-dynamic conditions as previously indicated. Of these elements, zirconium is preferred above all others as the one whose hydrous oxides are to be employed as the distender for the zinc oxide, with or without an indicated promoting oxide, in connection with gaseous and vaporous materials with respect to the various hydrogenation, dehydrogenation and reforming operations indicated. While these zirconium oxides may not be the cheapest, they are nevertheless preferred especially because of the ease of handling them.

Referring in greater detail to the different types of materials which may be modified through the medium of the indicated catalysts of the present invention, one aspect of particular industrial importance is the dehydrogenation of the low boiling or normally gaseous paraffinic hydrocarbons heavier than methane which may be transferred into corresponding mono-olefines to provide unsaturated starting materials which can be converted by synthesis into a variety of chemicals or into polymer or synthetic gasolines and lubricating oils. Also, any hydrocarbon capable of being vaporized and dehydrogenated may be so heat-treated in gaseous or vaporous form in the presence of these catalysts, including not only these types of gaseous and liquid hydrocarbons above indicated but also solid aliphatic hydrocarbons, naphthenic hydrocarbons especially naphthenic 6-membered rings, and in general other petroleum fractions.

As to the gaseous hydrocarbons mentioned, these include ethane, propane, butane, iso-butane, the pentanes, the hexanes and the like, which include the corresponding iso compounds, and mixtures thereof which may be obtained by absorption, distillation or other means, and may or may not be de-sulfurized according as their sulfur content may make necessary or desirable. If refinery gases and the like already contain unsaturates, they will be removed ordinarily by preliminary treatment if in appreciable quantity, thereby to obtain a direct supply of the unsaturates and also to reduce a tendency to deposit tar on the catalysts.

In treating normally liquid materials, as well as normally gaseous materials, it is preferable to work in the gaseous or vaporous state and to bring the gases and vapors up to the reacting temperature or somewhat above in order to supply part of the heat necessary in the subsequent endothermic reaction. This avoids cooling of the catalytic material which also should be heated to the reaction temperature required. In general operation, the heated gaseous or vaporous hydrocarbons will be intimately contacted with the surfaces of the heated catalyst as by passing of the hot vapors or gases through packed bodies of granular or pellet-like catalyst particles. The catalyst may also be commingled as a dust. Contact times may range from one-fifth of a second to five or ten seconds, according to requirements for sufficient but not excessive time to accomplish the desired conversions. Unreacted materials may be recycled. In general, operations may be conducted preferably at about atmospheric pressure. Obviously it is preferable to employ vessels constructed of non-catalytic material, for example stainless steel alloy tubes containing 18% nickel and 8% chromium which is substantially non-catalytic, or silicious or ceramic, or coated tubes and vessels.

With respect to temperatures of operation, these in general will lie between about 850° F. and 1100° F. for the treatment of both true gases and vapors of heavier materials, regardless of whether these treatments be for purposes of mere dehydrogenation or for more complex conversions such as reforming hereinafter more fully described. Obviously the temperature in any given instance should be high enough to correspond to a substantial equilibrium of concentration of mono-olefin, but should not be so high as to induce side reactions or to injure the catalyst. In general the reactions at 850° F. result in low conversion and longer catalyst life, whereas increase in temperatures up toward 1100° F. in general increases the rate of conversion by reducing the life of the catalyst. For practical operations, I find that in general the process is advantageously operated to give a 10% to 40% conversion to unsaturates per pass. With the catalysts of the present invention, equilibrium conditions whereby maximum conversion is obtained are reached in a very brief interval of time, that is, within a few seconds as distinguished from the much longer time, for example sixty seconds or more, and higher temperatures required without the catalyst. Thus, when employing a contact time of about one second with catalysts herein described, I have obtained at 850° F. a 15% to 17% conversion of iso-butane to iso-butylene as compared with the theoretical 18%. Considerable variation in choice of temperature is admissible; for example iso-butane may be dehydrogenated to give substantial yields of iso-butene at temperatures from about 800° F. upward to about 1000° F., and temperatures approaching 1100° F. may be employed provided the contact time is exceedingly short.

When dehydrogenating the normally gaseous hydrocarbons, they are heated to a reacting temperature and then passed through suitable non-catalytic vessels, such as tubes previously indicated, containing spaced heated catalytic beds, the gases being reheated as they pass from one conversion bed to the next. Or the gases may be treated in kindred apparatus. Upon removal from the system, the unsaturates in the treated gases can be converted into gasoline by polymerization and the gasoline fraction may be separated from the gases by condensation, the unconverted hydrocarbon (for example butane) being fractionated to free it from hydrogen and returned to the dehydrogenation unit.

In using hydrous oxide-zinc oxide catalysts hereof in catalytic reforming of gasoline, previously mentioned, their importance resides in the improvement in knock rating for motor fuels. With respect to the term "reforming," while such operations are essentially the same as those of the above described dehydrogenation processes, the term also possesses a further significance. In addition to dehydrogenation of saturated hydrocarbons to produce olefines or the conversion of cyclo-hexane and its derivatives to aromatics, "reforming" includes other and different reactions. While these are complex reactions, I find indications of molecular re-arrangements of the types that lead to the production of aromatics from cyclo-pentane hydrocarbons and also other evidence indicating that alkylation, ring closure and other types of reactions are taking place. In any event the final effect of reforming is to increase the knock rating of gasolines.

Various types of stocks are suitable for these reforming processes provided they contain substantial amounts of hydrocarbons within the gasoline boiling range. Heavier boiling fractions such as crude gasoline are eminently suited to reforming. While the process is operable on any otherwise suitable petroleum fractions, the highest knock ratings are obtained when working on petroleum fractions containing substantial percentages of naphthene hydrocarbons. In carrying on a reforming process according to the present invention, the procedure is very much like that described for the dehydrogenation of a normally gaseous hydrocarbon. The stock may be heated under pressure and flashed, or otherwise vaporized, and then commingled if desired with an inert carrier gas, or the carrier gas may be introduced into the flashing unit, as at the bottom where it may exercise a stripping action on the unvaporized hydrocarbons. The commingled vapors and carrier gas are heated to reacting temperature or somewhat above and passed through apparatus containing catalyst beds such as previously indicated in connection with dehydrogenation processes. The reforming reactions are, like the reaction of dehydrogenation, endothermic, and it is necessary to supply the heat of reaction by heating the catalyst or by providing heating surfaces between the catalyst beds or by reheating the vapors and gases between a series of converters, or by recycling unconverted materials through a single converter and providing a heating step in said recycle, or by other suitable means.

Contact times of ½ to 10 seconds are suitable in that they effect the desired increase in knock rating; normally a contact time of 3 seconds is sufficient. In order to avoid complex apparatus, it is preferable to work at atmospheric pressure but sub-atmospheric or super-atmospheric pressures may be used, if desired.

Temperatures from 850° F. to 1100° F. are suitable for reforming in the presence of hydrous oxide-zinc oxide catalysts. There is but little or no reforming effected by temperatures below 750° F., while temperatures in excess of 1100° F. tend to endanger the catalyst. The exit vapors and gases from the reforming unit are preferably passed in heat exchange relationship with incoming feed and then condensed to recover the reformed gasoline. The uncondensed gases are then compressed and fractionally distilled to recover on the one hand a fraction comprising hydrogen and methane which fraction, if desired, may be recycled as carrier gas and on the other hand a fraction comprising saturated and unsaturated hydrocarbons containing from 2 to 4 carbon atoms. The unsaturates present in this latter fraction may be profitably polymerized to yield gasoline or used for other purposes. The condensate as produced is a high knock rating gasoline, and depending upon the character of the stock and the degree of reforming may or may not require redistillation and a nominal treatment to give gasoline of the desired boiling range, color and stability. Suitable treatments for this condensate, designed to improve the color and stability are vapor phase treatment with adsorptive clay or vapor phase treatment with concentrated zinc chloride solution, both of which vapor phase treatments may, if desired be made on the uncondensed vapors in the form in which they leave the catalytic reforming unit, or with condensate may receive a light treatment with sulfuric acid or similar reagent.

A gasoline stock of the following characteristics was catalytically reformed with procedure and equipment indicated:

Engler °F.; initial 168; 50% 264; dry point 370 gravity; 56.1° A. P. I.
Hydrocarbon composition:

| | |
|---|---|
| Unsaturates | 0% |
| Aromatics | 1% |
| Naphthenes | 47% |
| Paraffines | 52% |
| Percent sulfur | 0.003% |
| Refractive index $nD$ | 1.4155 |
| Knock rating | 50 |

A hydrous aluminum oxide-zinc oxide catalyst was used at a temperature of 950° F., and two volumes of hydrogen was used as carrier gas per unit volume of gasoline vapor. A sample of the total gasoline reformed in the first 5 hours of operations showed the following characteristics:

Engler °F.; initial, 145; 50%, 254; dry point, 400 gravity; 51.5° A. P. I.
Hydrocarbon composition:

| | |
|---|---|
| Aromatics plus unsaturates | 33.1% |
| Naphthenes | 35.9% |
| Paraffines | 31.0% |
| Percent sulfur | 0.003% |
| Refractive index $nD$ | 1.4295 |
| Knock rating | 75 |

The condensate contained but little di-olefines and was, therefore, relatively stable in spite of its substantial content of mono-olefines. The substantial increase in knock rating may be due, in part, at least, to the increase in content of unsaturates and aromatics although as previously noted, there have been indications that reactions such as molecular rearrangement, ring closure, alkylation and the like are involved. However, it is not desired to be bound by any theory as to the precise reactions responsible for the increase in knock rating.

Samples taken during the run showed an initial conversion to aromatics of 27.5 percent which gradually decreased to a value of 10.8 percent at the end of the five hour period. The catalyst was then blown with flue gas to which gradually increasing amounts of air were added for 4 hours at the end of which period undiluted air was being used and regeneration of the catalyst was shown by the absence of carbon dioxide in the effluent gases. Following the regeneration the catalyst was contacted with a stream of hydrogen at the same temperature, namely 950° F. for a period of two hours and then switched back into reforming use with the result that again an initial conversion of 27.5 percent was obtained.

In commercial production, it is advisable to have several catalytic reforming units, the majority of which are kept on-stream while the remainder are regenerated in order to provide for a continuous operation of the process.

As previously stated, the process may be used to dehydrogenate any hydrocarbon capable of being vaporized and susceptible to dehydrogenation. For example, methyl cyclo-hexane was dehydrogenated to toluene obtaining an initial conversion of 45% at 900° F. and three seconds contact time over a zinc oxide-hydrous oxide catalyst. At 950° F. an 80 percent conversion to toluene was initially obtained.

In another instance paraffin wax was melted and vaporized by passing a stream of methane through the molten wax. The commingled methane and wax vapors were brought to 850° F. and passed at that temperature over a hydrous oxide-zinc oxide catalyst. The condensate obtained from the exit gases was found to contain 40% of mono-olefines of approximately the same molecular weight as the original saturated wax.

The carrier gels of the metals here described are to be distinguished from the jelly type of the so-called silica gels which are precipitated with acids, whereas the present gels are precipitated with alkalies and also possess otherwise different characteristics.

In the preparation of these catalysts it is highly preferable that the gel contain substantially no electrolytes which will not reduce to metal oxides in a final dehydration and reduction prior to use of the catalyst, inasmuch as such electrolytes have been found to damage the catalyst and detract from its activity. This condition may be obtained, for example, by washing out substantially all the water-soluble reaction products produced by metathesis of the metal salts and the precipitants. Similarly, where a water-soluble salt is to be adsorbed on the gel, it should be one which will readily reduce to an oxide at the temperatures and conditions employed in preparation, for example, a nitrate.

Also, where a basic oxide, such as an alkali metal oxide, or an alkaline earth metal oxide, or the like, is employed as a promoter or is otherwise present, water-soluble salts of such metals should not remain in greater amounts than necessary to yield the desired amounts of oxide, that is, a preferred maximum of about 5% and preferably not over about 2% oxide.

Also, it is to be understood that, in addition to dehydrogenation and reforming, these catalysts may be used in the reverse or hydrogenation reactions by choice of suitable thermodynamic conditions, the catalysts being correspondingly effective in the hydrogenation of unsaturated hydrocarbons or aromatics. For these purposes, for example, temperatures may be employed between 200° F. and 1000° F. so long as equilibrium conditions and temperatures high enough to activate the catalyst are maintained. Therefore, the invention extends also to use of the present catalysts for both hydrogenation and dehydrogenation, during which the carbon-hydrogen ratio is changed.

The examples and illustrations here given are intended to be illustrative only and it is understood that they introduce no limitations not required by the restrictions of the prior art.

I claim:

1. A catalyst comprising an hydrous oxide of zinc and hydrous oxide gel of a metal whose oxide is difficultly reducible, the catalyst being free from silicious constituents.

2. A catalyst consisting essentially of zinc oxide and the hydrous oxide gel of a metal whose oxide is difficultly reducible, the catalyst being substantially free from electrolytes not readily reducible to oxides, and containing a small proportion not more than about 5% of oxide of metal of the class consisting of alkali metal and alkaline earth metal.

3. A catalyst for the thermal conversion of hydrocarbons heavier than methane comprising hydrous zirconium oxide gel and zinc oxide.

4. A catalyst for the thermal conversion of hydrocarbons consisting essentially of hydrous zirconium oxide gel and zinc oxide and free from silicious constituents.

5. A method for preparing a hydrous oxide gel catalyst which comprises precipitating a difficultly reducible hydroxide gel, supplying zinc oxide to the wet gel, drying the precipitated hydroxide at a temperature below about 300° F until the volume of the precipitate is decreased to less than about half of its original volume, and further dehydrating the catalyst at a higher temperature but below white heat.

6. A process for the preparation of a catalyst from a mixture of hydroxides which comprises the precipitation of at least one component as a metal hydroxide, the suspension of this precipitated hydroxide in a solution of a second component and the addition of a precipitant to said suspension to precipitate the metal hydroxide of the second component.

7. A process comprising subjecting hydrocarbon gases and vapors to a conversion temperature in the presence of a catalyst produced by precipitating a difficultly reducible metal hydroxide gel and while still wet depositing zinc oxide thereon, and partially dehydrating the gel.

8. A method for changing the carbon-hydrogen ratio of hydrocarbons which comprises subjecting hydrocarbon gases or vapors heavier than methane to a conversion temperature in the presence of a catalyst comprising a difficultly reducible, hard, porous, hydrous oxide gel containing zinc oxide, the catalyst being substantially free from salts and containing an effective amount but not exceeding about 2% of a basic oxide promoter.

9. A process for the hydrogenation of non-benzenoid hydrocarbons comprising subjecting gases and vapors of such hydrocarbons to a conversion temperature in the presence of zinc oxide carried on a zirconium oxide gel.

10. A method for the thermal conversion of hydrocarbon gases and vapors comprising subjecting such gases and vapors at a conversion temperature to a catalyst comprising zinc oxide, zirconium oxide gel and an oxide of the group consisting of alkali metal oxides and alkaline earth metal oxides.

11. A method of producing a catalyst for the thermal conversion of hydrocarbons comprising precipitating hydroxides of metals whose oxides are difficultly reducible from a salt solution of such metal by means of ammonium hydroxide, washing the precipitated hydroxide free from electrolytes, mixing a solution of a zinc salt with said hydroxide while still wet from its original precipitation, precipitating zinc hydroxide in the presence of said metal hydroxide, removing the solution and partially dehydrating the precipitated hydroxides to yield a gel catalyst.

12. A method for the thermal conversion of normally gaseous hydrocarbons heavier than methane comprising subjecting said hydrocarbons to a conversion temperature in the presence of a catalyst comprising hydrous zirconium oxide gel and zinc oxide.

13. A method for the thermal conversion of normally gaseous hydrocarbons heavier than methane comprising subjecting said hydrocarbons to a conversion temperature in the presence of a catalyst comprising hydrous thorium oxide gel and zinc oxide.

14. A method for the thermal conversion of normally gaseous hydrocarbons heavier than methane comprising subjecting said hydrocarbons to a conversion temperature in the presence of a catalyst comprising hydrous titanium oxide gel and zinc oxide.

15. A method for reforming gasoline and similar hydrocarbons comprising subjecting such hydrocarbon vapors to a conversion temperature in the presence of a catalyst consisting of hydrous zinc oxide and a difficultly reducible, hard, porous, hydrous metal oxide gel.

16. A method according to claim 15 wherein the gel is a hydrous oxide of at least one metal from the class consisting of aluminum, titanium, zirconium and thorium.

17. A method for reforming gasoline and similar hydrocarbons comprising subjecting such hydrocarbon vapors to a conversion temperature in the presence of zinc oxide carried on zirconium oxide gel.

18. A method for reforming gasoline and similar hydrocarbons comprising subjecting such hydrocarbon vapors to a conversion temperature in the presence of zinc oxide and thorium oxide gel.

19. A method for reforming gasoline and similar hyrocarbons comprising subjecting such hydrocarbon vapors to a conversion temperature in the presence of zinc oxide and titanium oxide gel.

20. A method for the dehyrogenation of hydrocarbons comprising subjecting hydrocarbon gases or vapors heavier than methane to temperatures between about 800° F. and about 1150° F. and effecting dehydrogenation thereof in the presence of a catalyst substantially free from salts comprising zinc oxide carried on a hard, porous oxide gel of zirconium.

WALTER F. HUPPKE.